Patented Jan. 30, 1940

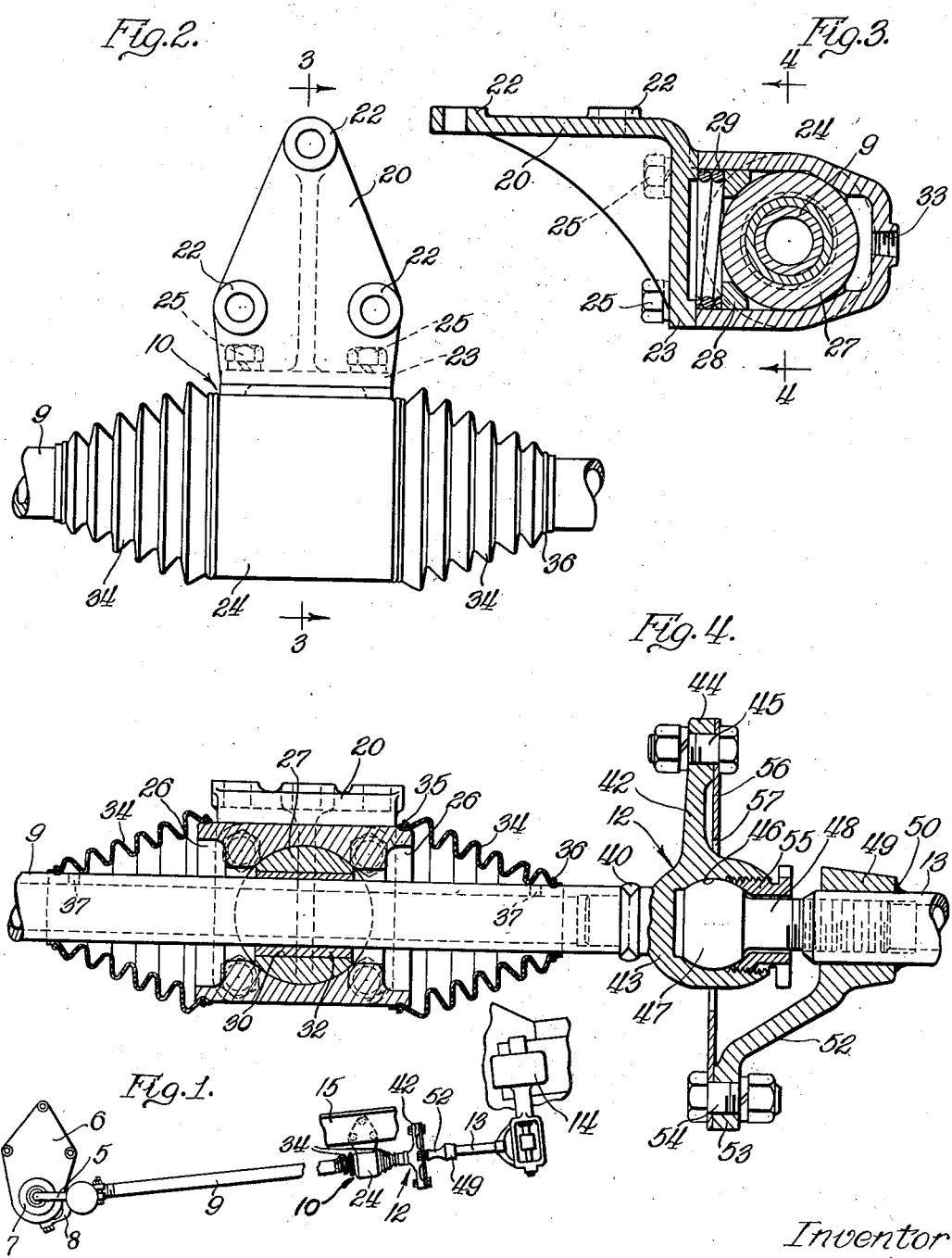

2,188,510

UNITED STATES PATENT OFFICE 2,188,510

MOTION TRANSMITTING MEANS

Robert Lapsley, Berrien Springs, Mich., assignor to Clark Equipment Company, Buchanan, Mich., a corporation of Michigan Application June 1, 1937, Serial No. 145,701

10 Claims. (Cl. 74—473)

This invention relates to transmission supporting means, and more particularly is directed to means for supporting the intermediate portion of the motion transmitting member extending between a selective shift mechanism for a transmission and the transmission itself, such as commonly employed in connection with motor vehicles of the type in which the transmission is mounted adjacent the rear end of the vehicle, while the shifting mechanism therefor is disposed near the forward end of the vehicle in the driver's compartment, or in assemblies commonly known as the cab-over-engine type trucks and the like.

In the development of automotive vehicles, and more particularly in connection with trucks and busses, a considerable problem has been introduced with the advent of the cab-over-engine type of body construction, as well as with the introduction of rear engine mounted assemblies in which the transmission or change-speed mechanism is disposed adjacent the rear driving axle. It is to be understood that the present invention is equally applicable to constructions in which a multi-speed axle is employed, and suitable shifting mechanism must be provided for control by the operator at a point removed from the speed-changing mechanism. This remote control type of transmission mechanism is disclosed generally in my copending application, Serial No. 20,803, filed May 10, 1935.

I have found that one of the problems involved in the use of a mechanism in which the shifting operation is accomplished at a point remote from the transmission, resides in the proper support of the connecting member through which the shifting motion is transmitted from the shifting mechanism to the transmission. It is essential in such constructions to provide a support which will carry the weight of the motion transmitting member which may be of relatively great length, and which, at the same time, will so support it that it is free for both the limited rotative and longitudinal movement necessary to effect selective change of speed through the transmission. Such motion-transmitting members are preferably formed of tubular shafting or the like, which is swung laterally and upwardly at the gear shift end whereby it is rotated to a limited extent about its longitudinal axis to effect selection of the particular shifter rod desired, and which must then be moved longitudinally to actuate the shifter rod for shifting the gears in the transmission. At the same time, due to the lateral swinging of the member, and also the twisting stresses imposed upon the vehicle frame, the support must be of a more or less universal character so that the twisting of the frame will not affect positive and accurate control of the shifting mechanism.

It is therefore a primary object of the present invention to provide a transmission supporting means which will support the motion transmitting member in such manner that positive and controlled rotative and longitudinal movement can be transmited through the member independently of angular stresses which may be imposed thereon due to the transverse swinging of the gear shift lever and the distortion of the frame of the vehicle between the shifting mechanism and the transmission.

Another object of the present invention is to provide coupling means operating in conjunction with the supporting mechanism to insure that the motion transmitting member will be properly coupled to effect the proper selection and movement of the shifter rods in the transmission.

Still another feature of the invention resides in a support which can be properly lubricated, and which has resilient means for holding the motion transmitting member against vibration or relative displacement caused by forces other than the operation of the shifting mechanism.

Another advantage accruing from the present construction is the provision of a simplified form of support which can be readily attached to and detached from any rigid structural member of the frame or chassis of the vehicle, and which is of simple and compact form requiring relatively few parts, and which may be readily assembled and installed.

Other objects and advantages of the present invention will be apparent from the following detailed description which will disclose to those skilled in the art, in conjunction with the accompanying drawing, a preferred form of the present invention and its manner of operation.

In the drawing:

Figure 1 is a diagrammatic view showing the application of the present invention to a remote control transmission;

Figure 2 is a top plan view of the supporting means;

Figure 3 is a sectional view taken substantially on line 3—3 of Figure 2; and

Figure 4 is a sectional view taken substantially on line 4—4 of Figure 3, and also showing the coupling of the motion transmitting member to the selecting member.

Referring now in detail to the drawing, I have shown somewhat diagrammatically in Figure 1 a gear shift member 5 supported on a suitable bracket member 6 which may be bolted to the floor board of the vehicle, or supported in any other suitable manner, and which is connected at its lower end below its universal pivotal support 7 to a yoke member 8 coupled to the forward end of the motion transmitting member 9.

The member 9 extends through the supporting means indicated generally at 10 and its opposite end is connected through the coupling indicated generally at 12 to a suitable selecting member 13 which, in turn, is connected in any suitable manner to the shifter rod actuating mechanism 14. This latter connection may be as described in my above-mentioned copending application. The supporting means 10 is preferably mounted on a rigid frame member 15 such as the side frame channel, cross channel, or a similar rigid part of the chassis located adjacent the rear end of the member 9. Thus, shifting movement of the member 5 imparts corresponding rotative and longitudinal movement to the member 9 which, through the coupling means 12, transmits this movement to the member 13 where it is in turn transmitted to the shifter rod selecting mechanism 14 for initially engaging a predetermined shifter rod, and subsequently moving this rod to effect corresponding movement of the selected gears.

Considering now in detail the supporting means 10, this comprises a bracket 20 of angular shape having a top surface provided with suitable boss portions 22 whereby it may be bolted to the flange of a channel or cross frame member such as the member 15, or secured in any other suitable manner to a rigid portion of the frame structure of the vehicle. The member 20 has a portion 23 extending at right angles thereto, which is provided with a suitable boss for receiving the retaining member 24 which is secured thereto by the bolts 25. Any desired shape of bracket may be provided, depending upon the position and configuration of the supporting member 15.

The retaining member 24 has a substantially cylindrical portion open at its opposite ends as indicated at 26 in Figure 4, and suitably formed on its interior to receive the ball member 27 for universal movement therein. The ball member 27 is urged away from the portion 23 of the bracket 20 by means of a spring follower ring 28, between which and the face of the flange 23 there is provided a relatively heavy coiled spring member 29 normally holding the ball member 27 in fixed lateral and longitudinal position within the retaining member 24.

The member 27 is provided with a transverse boss 30 within which is pressed the bushing sleeve 32, preferably formed of bronze or suitable bearing material, for receiving the motion transmitting member 9 and forming a bearing member allowing longitudinal and rotative movement of the member 9 within the member 27. Since the member 27 is itself capable of universal movement within the retaining member 24, it is obvious that the member 9 may move angularly within the bracket without in anywise disturbing its freedom for rotative and longitudinal movement.

The member 9 is preferably hollow in order to reduce its weight and to lend it increased rigidity, and the bearing sleeve 32 and ball member 27 are preferably lubricated by means of a lubricant fitting threading into the tapped opening 33 formed in the retaining member 24. Suitable oil holes may be formed in the ball 27 for admitting oil to the bushing 32, which preferably is of porous oil absorbing material.

Suitable flexible dust proof enclosing members 34 of generally conical form are secured about the marginal edges defining the openings 26 by means of a suitable spring ring 35, and at their smaller ends are secured to the lateral surface of the member 9 by means of the spring rings 36 engaging in suitable notches in the surface of member 9. These members form bellows-like enclosures for preventing dirt or the like from entering the openings 26, and due to the fact that the rod 9 has longitudinal movement, the members are so formed as to be capable of axial expansion and contraction. To accommodate this movement without building up undue pressures in the closures, the member 9 is provided with radial ports 37 so that the air pressure upon opposite sides of the bearing assembly will be equalized when the rod is moved longitudinally, these ports communicating through the interior of the member 9 with the interiors of the bellows member 34.

It will thus be apparent that the rod 9 is resiliently supported against vibration or rattling with respect to the bearing support by means of the spring 29, and that the ball member and bushing sleeve 32 accommodate rotative and longitudinal movement of the member 9 for transmission of shifting movement from the member 5 to the member 13 regardless of possible angularity introduced between the bracket and the member 9 by reason of swinging movement of the yoke member 8 upon actuation of the shift rod, or twisting or distortion of the frame members, or for other reasons. This is accommodated by the universal support of the ball 27 within the retaining member 24.

At its rear end the member 9 is provided with a chamferred edge to which is suitably welded, as indicated at 40, one yoke 42 of the coupling means 12. The yoke 42 is in the form of a hub portion 43, having diametrically oppositely extending arm portions terminating in suitable coplanar bosses 44 which are apertured to receive the bolts 45. The hub portion 43 of the member 42 is provided with a socket or recess 46 receiving the spherical end 47 of a suitable stud 48 threaded into the end of the member 13.

A second coupling or yoke member 49 has its hub portion welded to the forward end of the member 13, as indicated at 50, and is provided with diametrically oppositely extending arms 52, each terminating in suitable coplanar bosses 53 apertured to receive the bolts 54. A suitable follower member 55 is threaded into the outer end of the hub portion 43 of the member 12 to secure the ball portion 47 of the stud 48 against axial movement with respect to the member 12 while providing for free universal movement of the member therein.

A resilient spring disc 56, which has a central aperture 57 formed therein extending about and spaced from the hub portion 43 of the member 12, has four outwardly extending ear portions respectively clamped to the bosses 44 and bosses 53 by means of the bolts 45 and 54 carried by the arms of the coupling yoke members. The yoke members are disposed at right angles, that is, one of the arms of each member is disposed intermediate the arms of the other member, with the bosses 44 and 53 disposed substantially in the same plane.

Longitudinal movement of the member 9 is transmitted directly to the member 13 through the ball and socket connection 46—47 since the ball portion 47 is positively held in position by the member 55 so that no lost motion is effected during longitudinal movement of the member 9. Rotative movement of the member 9 is transmitted to the member 13 through the coupling members 12 and 49 connected together by the spring disc 56. The spring disc 56 allows slight angular displacement of the axes of the members 9 and 13 without producing any lost motion in the transmission of rotative movement therebetween. Thus a substantially universal coupling is provided between the members 9 and 13 which insures positive transmission of rotative and longitudinal movement of the member 9 to the member 13, while at the same time, accommodating angular misalignment between these members due to swinging of one end of the member 9 by the shift lever 5.

Thus, it will be seen that the coupling means 12 transfers the preselected shifting movement imparted to the member 9 by the member 5 to the member 13 without any possible lost motion therebetween, insuring that the member 13 will transfer the predetermined selective shifting movement of the member 5 to the shifter rod mechanism 14. Since the limits of shifting movement are relatively small, it is essential that a coupling, such as provided by disc 56, be employed to prevent any loss of rotative movement therethrough.

I am aware that changes in the construction of the various constituent parts of the present invention may be made without departing in any way from the underlying principles of the present invention, and I therefore do not intend to be limited except as defined by the scope and spirit of the appended claims.

I claim:

1. Means for supporting a motion transmitting member adapted for rotative and longitudinal movement, comprising a hanger bracket mounted on a fixed support, means carried by said bracket including a ball member having a transverse bearing sleeve extending therethrough and receiving said motion transmitting member, said ball member being mounted for universal movement with respect to said bracket, and having limited lateral movement with respect thereto, and spring means normally urging said ball member away from said bracket.

2. In combination, a remotely disposed change speed selecting mechanism and an intermediate motion transmitting shaft, coupling means for connecting said shaft to said selecting mechanism including a pair of yoke arms, one mounted on said shaft and the other on said selecting mechanism a planar spring disc extending normally therebetween and jointly connecting said yoke arms for effecting conjoint rotation therebetween, and a ball and socket connection between the end of said shaft and said selecting mechanism for effecting conjoint longitudinal movement therebetween independently of angular misalinement.

3. The combination, with a motion transmitting shaft, of supporting means for the intermediate portion of said shaft comprising a housing and a ball member therein accommodating limited angular and lateral displacement of said shaft, said ball member having limited lateral movement in said housing, bearing means supporting said shaft within said ball member for rotative and longitudinal movement independently of its angular position, and spring means holding said ball member resiliently in position in said housing.

4. Supporting means for the intermediate portion of a shaft adapted to be rotated and moved longitudinally comprising a fixed bracket, a substantially cylindrical retaining member secured thereto, a ball disposed within said member and having an opening therethrough receiving said shaft, said shaft having limited universal movement with said ball as a pivot, flexible closure means between said shaft and each end of said retaining member, and means for equalizing the pressures within said closure means upon longitudinal movement of the shaft.

5. Supporting means for the intermediate portion of a shaft adapted to be rotated and moved longitudinally comprising a fixed bracket, a substantially cylindrical retaining member secured thereto, a ball disposed within said member and having an opening therethrough receiving said shaft, said ball being movable transversely in said member, said shaft having limited universal movement with said ball as a pivot, and spring means resiliently maintaining said ball against transverse displacement in said retaining member.

6. In combination, a motion transmitting shaft, a fixed structural member, means supported on said member including a cylindrical portion through which said shaft extends, a ball swivelled in said cylindrical portion and having bearing means engaging about said shaft, said bearing means accommodating rotative and longitudinal movement of said shaft with respect to said ball, means retaining said ball against displacement in said cylindrical portion whereby said shaft has limited universal movement therein, said shaft being hollow, and sealing means secured to the ends of said cylindrical portion and enclosing oppositely extending portions of said shaft, said shaft providing communication between said sealing means for equalizing pressures therein upon longitudinal movement of the shaft.

7. Means for coupling a pair of shafts disposed in substantial longitudinal alignment and having adjacent ends, comprising a yoke carried by the end of one shaft including oppositely extending arm portions and having a central socket portion, means carried by the other shaft including a ball portion fitting in said socket portion and held against displacement therefrom, a yoke arm secured to said other shaft and having arm portions terminating in the plane of said first-named arm portions, and a resilient disc apertured to fit around said socket portion and clamped to all said arm portions, whereby said shafts are coupled for rotative movement through said disc and for longitudinal movement through said ball and socket connection.

8. Means for coupling a pair of shafts disposed in substantial longitudinal alignment and having adjacent ends, comprising a yoke carried by the end of one shaft including oppositely extending arm portions and having a central socket portion, means carried by the other shaft including a ball portion fitting in said socket portion and held against displacement therefrom, a yoke arm secured to said other shaft and having arm portions terminating in the plane of said first-named arm portions, and a resilient disc apertured to fit around said socket portion and clamped to all said arm portions, said disc extending normally to said shafts and having the plane thereof passing through the center of said ball and socket connection, whereby said shafts are coupled for rotative movement through said disc and for longitudinal movement through said ball and socket connection.

9. In combination, a stationary bracket, a retaining housing secured thereto and having oppositely extending cylindrical ends, a ball member universally supported in said housing and movable transversely therein intermediate said ends, a cylindrical bore in said ball, a hollow shaft extending through said housing and rotatably and slidably supported in the bore of said ball, and spring means in said housing normally holding said ball in alinement with said ends thereof, said ends having an internal diameter substantially greater than said bore.

10. The combination of claim 9 further characterized in the provision of flexible sealing members between each end of said housing and said shaft, and ports in said shaft within said sealing members for equalizing pressures therein upon longitudinal movement of said shaft.

ROBERT LAPSLEY.